UNITED STATES PATENT OFFICE.

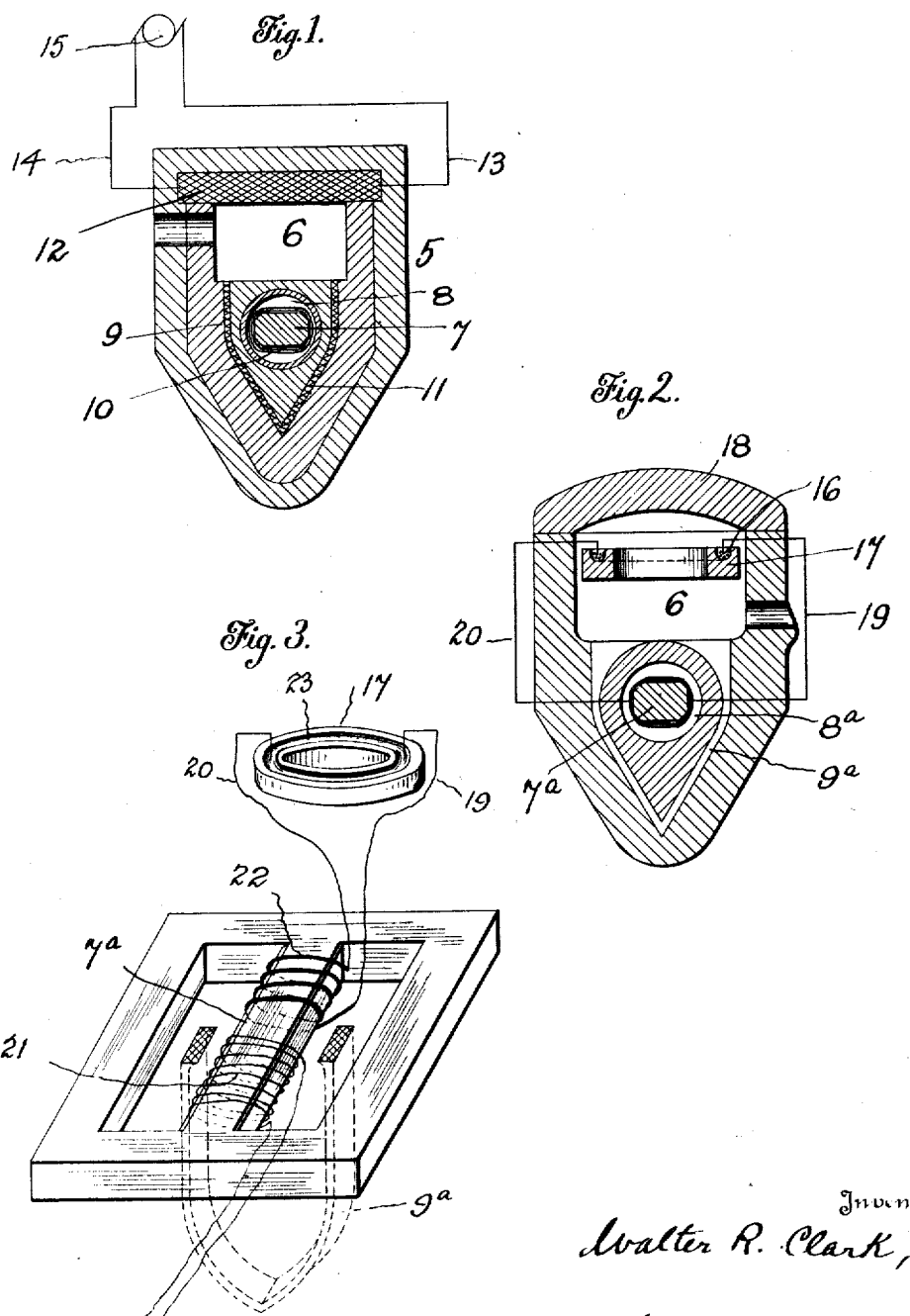

WALTER R. CLARK, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

ELECTRIC FURNACE.

1,328,713.  Specification of Letters Patent.  Patented Jan. 20, 1920.

Original application filed May 6, 1918, Serial No. 232,753. Divided in part and this application filed May 31, 1918. Serial No. 237,562.

*To all whom it may concern:*

Be it known that I, WALTER R. CLARK, a citizen of the United States, residing in Bridgeport, in the county of Fairfield and State of Connecticut, have invented certain new and useful Improvements in Electric Furnaces, of which the following is a full, clear, and exact description.

This invention relates to electric furnaces for melting brass and similar scrap, the present application being in part a division of my application, Serial No. 232,753, filed May 6, 1918, and referring more particularly to an electric furnace adapted to the practice of the method described and claimed in that application.

In the melting of brass turnings, shavings and similar scrap, the electric furnace of the induction type has given fairly successful and satisfactory results, particularly where a secondary consisting of a part of the molten metal of the charge is located below the main body of the charge or bath and so arranged as to promote the circulation of the bath by motor effect. It has been found, however, that in the melting of brass and similar scrap in a furnace of this kind, there is a tendency for the upper surface of the metal bath to become chilled and thereby to become hardened or incrusted, forming a bridge or arch that is separated from the molten part of the charge. Such a chilling and incrustation of the charge surface, forming an inert layer on top of the bath, is caused by the fact that the brass chips usually have a film of oil on the same or more or less dirt, which acts as an insulator in preventing the flow of heat into such chips; and the air in the interstices between the fragments of scrap also acts as an insulator which separates them from the bath beneath. Naturally the separation of the upper part of the charge from the lower part causes a considerable part of the metal to remain unmelted throughout the heating of the charge or for a longer period than is conducive to proper furnace operation, and the efficiency of the furnace is cut down, the output of molten metal being less than it should be, and the power consumption greater.

One of the primary objects of the present invention is to overcome the difficulties and drawbacks just noted, by providing an improved electric furnace having means for neutralizing the tendency for the surface of the molten metal to chill and for preventing at the same time the heating of the upper part of the charge to such an extent as to volatilize appreciably the zinc or other volatile constituent of the alloy.

Another object of the invention is to provide an electric furnace of the induction type having a channel below the bath for the heating and circulation of the bath by induction of electric current in the secondary formed by the metal in said channel, and also having in the furnace chamber above the bath, an auxiliary electric heating element constituted by a suitable resistor which throws a moderate degree of heat downward against the upper surface of the metal bath.

Still another object of the invention is to furnish an electric furnace operated by alternating current, which is very efficient and wherein the power factor is very much improved, as compared to prior furnaces used for the melting of brass and other metal.

Another object which I have in view is the provision of an electric furnace, in which the induction and resistance principles are coördinated in an especially effective manner. In one form, the current for heating the resistor or similar auxiliary heating means is created by induction from the main primary core and coil, which induces the main heating current in the so-called secondary channel beneath the bath, and the arrangement in question is especially efficient and produces a very good power factor, the waste of magnetic lines of force and the loss of heat being cut down to a minimum.

To these and other ends, the invention consists in the novel features and combinations of parts to be hereinafter described and claimed.

In the accompanying drawing,

Figure 1 is a diagrammatic vertical sectional view of an electric furnace embodying my improvements;

Fig. 2 is a similar view showing a somewhat modified arrangement; and

Fig. 3 is a detail perspective view of certain parts shown in Fig. 2.

In the drawing I have shown an electric induction furnace of the type wherein a secondary of molten metal is located in a suitable passage or channel, near the bottom of or beneath the body part of the charge or bath and in communication with the bottom of the furnace chamber, the arrangement being such that the metal in the channel is heated by the induction of electric current therein and circulated by motor effect in said channel, so as to transmit the heat to other parts of the bath. The furnace has a body 5 and an interior basin, hearth or chamber 6. The illustration is diagrammatic for the most part. I have not illustrated in detail the provisions for charging the furnace chamber and pouring off the molten metal, it being understood that any suitable arrangements may be made in this respect. The primary core 7 is only partially shown in Figs. 1 and 2, but it will be understood that it has a leg extending preferably in a horizontal direction through an opening 8 that traverses the furnace body from side to side at a point beneath the chamber 6. The secondary channel 9 is, in this instance, disposed in a vertical plane and is located beneath the chamber 6, the ends of said channel being in comunication with the chamber 6 at opposite sides of the latter. The molten metal of the charge passing down into the channel 9 forms the secondary of the transformer, being located in close proximity to the primary coil 10 which is wound on the core 7 within the opening 8. At the lower part of the secondary channel the latter preferably has an acute angle formed therein for the creation of motor effect, which promotes and maintains the circulation of the entire charge. The channel 9 is usually formed in a body of asbestos cement or similar insulating material within the lower part of the furnace casing.

The brass or other scrap to be melted is introduced into the chamber 6 in the usual manner, making contact with a ribbon or strip 11 of metal in the secondary channel. The primary is then excited by the passage of the alternating current through the coil 10, and the greater part of the charge in the furnace chamber is melted by contact with the metal of the secondary channel 9, which rapidly becomes melted and is circulated in contact with other parts of the bath, the metal being driven out of the channel at the upper ends thereof by motor effect and being constantly replaced.

The circulation promoted in this manner in the main part of the bath is quite efficient, but owing to the oil and dirt on the scrap metal and the air in the interstices between the fragments, the upper part of the charge becomes insulated and separated from the lower part forming a bridge or arch over the latter in the nature of a crust which is not heated sufficiently to melt, as above pointed out. In order to overcome this drawback and the consequent loss of efficiency, I provide means for heating the upper surface of the charge from above, which means is preferably in the nature of an electrical resistor, through which a suitable heating current is passed which, while effectively heating the upper part of the charge and preventing the chilling thereof, will not, nevertheless, heat any part of the charge to such an extent as to volatilize the zinc or other volatile constituent. This auxiliary electric heating means, which is of relatively weak heating effect as compared to the induction heating element below the surface of the charge, is preferably located in the space between the upper surface of the bath and the furnace top or roof, in such a location that heat is radiated from it in a downward direction against the upper surface of the bath. In Fig. 1, a resistor 12, consisting of a body of carbon or similar material, is located immediately beneath the top part or cover of the furnace, and forms, in effect, a part of the roof over the bath. This resistor is connected by leads 13, 14 to a suitable source of electric current 15. The current is of such strength and the parts are so arranged that while the resistor 12 throws down a considerable amount of heat against the top surface of the charge in the chamber 6 to overcome the drawbacks previously mentioned, the heating effect of the resistor is less than that of the transformer, it being desired to slightly heat the charge by the auxiliary heating means from the surface downward at a regularly lower rate than the heat of the metal in the secondary channel. The upper surface of the bath, while warmed to an extent which will prevent the chilling of the upper part of the charge and will speed up the operation of the furnace, will not, nevertheless, receive sufficient heat to volatilize any of the metal constituents to a prejudicial or harmful degree.

In the form shown in Fig. 2, the auxiliary heating means is constituted by a resistor 16 composed of a body of carbon or the like, lying in a groove in the upper surface of a refractory ring 17. This ring is suitably supported in the upper part of the furnace chamber above the bath, but beneath the roof, the arrangement being such that when the body of resistance material in the groove is heated by passing an electric current through it, the heat generated will be radiated for the most part against the roof or cover 18 of the furnace chamber, which roof or cover is suitably vaulted or arched at its under surface so as to cause the heat to be reflected downwardly against the upper surface of the metal bath. By preference, the auxiliary heating current which passes through the carbon or other resistor 16 by way of leads or conductors 19, 20 is supplied from the transformer which induces the heating current in the secondary channel 9ᵃ. To this end, the middle leg 7ᵃ of the transformer core, which passes through an opening 8ᵃ in the furnace body, has wound thereon, in addition to the primary coil 21, a secondary coil 22, to which the leads 19, 20 are connected at their lower ends. At their upper ends, the leads 19, 20 are connected in any proper manner with the ring 17, so as to lie in contact with the body of carbon in the groove. In Fig. 3, the groove is shown at 23, but the resistance material is omitted. It will be manifest that the showing of the coils in this view is of a diagrammatic character.

The form of furnace shown in Figs. 2 and 3 is especially efficient and has a very good power factor, owing to the fact that the secondary coil 22 utilizes a number of lines of force which would be otherwise wasted, thereby reducing the magnetic leakage, and also because the secondary coil can be located in very close proximity to the primary coil and core, as shown.

The auxiliary heating means in the upper part of the furnace has a marked influence in facilitating proper furnace operation and speeding up the output, and it can be very easily and economically furnished with electric current derived from the heating transformer without any loss in the efficiency of the transformer in heating the metal in the secondary channel adjacent the bottom portion of the furnace chamber.

Various changes may be made in the details of the furnace structure without departing from the scope of my invention as defined in the claims.

What I claim is:

1. In combination with an electric furnace of the induction type having a molten secondary in communication with the lower part of the charge, an electric resistance element in the furnace chamber above the charge for preventing the chilling of the upper surface of the latter.

2. In combination with an electric furnace of the induction type having a furnace chamber, a roof above said chamber and a secondary channel in communication with the lower part of the chamber, a heating element above the charge beneath the roof comprising a resistor for heating the upper surface of the furnace charge by downward radiation of heat.

3. In combination with an electric furnace of the induction type having a furnace chamber and a secondary channel in communication with the lower part of said furnace chamber, an electric resistor above the charge in the furnace chamber constructed and arranged to throw downward against the upper surface of the charge an amount of heat which, while preventing chilling or incrustation of the upper surface of the charge, is of less heating effect than the means for heating the metal in the secondary channel.

4. An electric furnace having a heating element above the charge, in the form of a resistor, and provided below the body portion of the charge with means for heating and circulating the charge by induced current.

5. In combination with an electric furnace of the induction type having a molten secondary and a primary core and coil coöperating with said secondary, a secondary winding on said core, and an auxiliary heating element above the charge connected with said secondary winding.

6. In combination with an electric furnace of the induction type having a molten secondary and a primary core and coil coöperating with said secondary, a secondary winding on said core, and an auxiliary heating element connected with said secondary winding, said auxiliary heating element located above the charge in the furnace chamber and arranged to throw heat downward against the upper surface of the charge to prevent chilling thereof.

7. In combination with an electric furnace of the induction type having a molten secondary below the charge and a primary core and coil coöperating with said secondary, a secondary winding on said core, and an auxiliary heating element connected with said secondary winding, said auxiliary heating element being of less heating effect than the induction heating means.

8. In combination with an electric furnace of the induction type having a furnace chamber, a secondary channel in communication with the lower part of said furnace chamber, and a primary core and coil for inducing heating current in the metal in the secondary channel, electrical auxiliary heating means located above the charge in the chamber, and means associated with the primary core whereby current is induced in said auxiliary heating means.

9. An electric furnace of the induction type having a primary core and coil and molten secondary, a secondary winding on said core, and an auxiliary heating device connected with said secondary winding, comprising a resistor located above the charge.

In witness whereof, I have hereunto set my hand, on the 28th day of May, 1918.

WALTER R. CLARK.